United States Patent
Bianco et al.

(10) Patent No.: US 9,722,494 B2
(45) Date of Patent: Aug. 1, 2017

(54) CONTROLLER FOR MULTIPHASE BOOST CONVERTERS

(71) Applicant: STMICROELECTRONICS S.R.L., Agrate Brianza (IT)

(72) Inventors: Alberto Bianco, Gressan (IT); Giuseppe Scappatura, Aosta (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 151 days.

(21) Appl. No.: 14/700,659

(22) Filed: Apr. 30, 2015

(65) Prior Publication Data
US 2016/0322898 A1    Nov. 3, 2016

(51) Int. Cl.
*H02M 1/08*    (2006.01)
*H02M 1/088*    (2006.01)
(Continued)

(52) U.S. Cl.
CPC ......... *H02M 3/1584* (2013.01); *H02M 1/083* (2013.01); *H02M 1/4225* (2013.01);
(Continued)

(58) Field of Classification Search
CPC .... H02M 1/083; H02M 1/084; H02M 1/0845; H02M 1/088; H02M 1/096; H02M 1/42; H02M 2001/0045; H02M 2001/0048; H02M 2001/0054; H02M 2001/0058; H02M 2001/4283; H02M 3/156; H02M 3/158; H02M 3/1582; H02M 3/1584; H02M 3/285; H02M 2003/1586
(Continued)

(56) References Cited

U.S. PATENT DOCUMENTS 4,886,981 A * 12/1989 Lentini .................. H02J 1/102
                                                        307/87
5,157,269 A * 10/1992 Jordan ..................... G05F 1/59
                                                        307/31
(Continued)

OTHER PUBLICATIONS

Bianco et al., "Enhanced Constant-On-Time Control for DCM/CCM Boundary Boost PFC Pre-regulators: Implementation and Performance Evaluation," 29th Annual IEEE Applied Power Electronics Conference and Exposition, Mar. 16-20, 2014, Fort Worth, TX, 7 pages.

(Continued)

*Primary Examiner* — Jeffrey Gblende
*Assistant Examiner* — David A. Singh
(74) *Attorney, Agent, or Firm* — Seed IP Law Group LLP

(57) ABSTRACT

A controller for a multiphase converter comprises a first stage controller for producing a first gate drive signal to turn on a first power transistor of a first boost converter; a delay element configured to produce a delayed signal by delaying the first gate drive signal by half a cycle length; a time difference detection element configured to: output a turn on command based on a zero crossing detection (ZCD) signal indicating that one or more zero current conditions of a second boost converter of the multiphase converter are met and the delayed signal; and a second stage controller configured to assert a second gate drive signal to turn on a second power transistor of the second boost converter based on the turn on command.

20 Claims, 7 Drawing Sheets

(51) Int. Cl.
*H02M 1/00* (2006.01)
*H02M 3/28* (2006.01)
*H02M 3/158* (2006.01)
*H02M 1/42* (2007.01)

(52) U.S. Cl.
CPC ............ *H02M 1/088* (2013.01); *H02M 3/285* (2013.01); *H02M 2001/0058* (2013.01); *Y02B 70/126* (2013.01)

(58) Field of Classification Search
USPC ............... 323/234, 235, 265, 268, 271, 272
See application file for complete search history.

(56) References Cited

U.S. PATENT DOCUMENTS

| | | | | |
|---|---|---|---|---|
| 6,141,231 | A * | 10/2000 | Brkovic | H02J 1/102 363/72 |
| 6,346,798 | B1 * | 2/2002 | Passoni | H02M 3/1584 323/272 |
| 6,664,659 | B1 * | 12/2003 | Adi | H02J 1/102 307/64 |
| 7,038,923 | B2 * | 5/2006 | Zhou | H02M 7/493 363/69 |
| 8,212,539 | B2 * | 7/2012 | Osaka | H02M 3/1584 323/222 |
| 8,248,041 | B2 * | 8/2012 | Rausch | H02M 1/4225 323/207 |
| 8,836,301 | B2 * | 9/2014 | Shono | H02M 3/1584 323/272 |
| 9,240,712 | B2 * | 1/2016 | Chandrasekaran | H02M 1/4225 |
| 9,252,655 | B2 * | 2/2016 | Yang | H02M 1/4225 |
| 2003/0048648 | A1 * | 3/2003 | Lin | H02M 3/1584 363/65 |
| 2006/0077604 | A1 * | 4/2006 | Jansen | H02J 1/102 361/90 |
| 2009/0257257 | A1 * | 10/2009 | Adragna | H02M 3/1584 363/65 |
| 2010/0097041 | A1 * | 4/2010 | Ayukawa | H02M 1/4225 323/272 |
| 2010/0181970 | A1 * | 7/2010 | Yang | H02M 3/1584 323/218 |
| 2010/0301826 | A1 * | 12/2010 | Moussaoui | H02M 3/1584 323/285 |
| 2013/0194842 | A1 | 8/2013 | Bianco et al. | |
| 2013/0194845 | A1 | 8/2013 | Bianco et al. | |
| 2014/0334196 | A1 * | 11/2014 | Chen | H02M 3/1584 363/21.04 |
| 2016/0043555 | A1 * | 2/2016 | Howell | G06F 1/263 307/23 |

OTHER PUBLICATIONS

Fairchild Semiconductor Corporation, "FAN9611-Interleaved Dual BCM PFC Controllers," Feb. 2013, 35 pages.
Semiconductor Components Industries, "NCP1631 Interleaved, 2-Phase Power Factor Controller," Rev 1.1.7, Jan. 2015, 24 pages.
Texas Instruments "*Natural Interleaving*™ Dual-Phase Transition-Mode PFC Controller," UCC28060, Revised Nov. 2008, 36 pages.

* cited by examiner

CONTROLLER FOR MULTIPHASE BOOST CONVERTERS

BACKGROUND

Technical Field

The present disclosure relates to controlling multiphase power factor correction (PFC) converters and, in particular, adaptively interleaving a plurality of multiphase PFC converters.

Description of the Related Art

It is generally known to use PFC devices for actively correcting the power factor of switched-mode power supplies (SMPS) used to supply electronic apparatuses, such as computers, televisions, monitors, etc., and lighting devices such as fluorescent lamps. A typical SMPS comprises a full-wave diode rectifier bridge, having an input connected to the AC power distribution line, and a capacitor connected downstream so as to produce a DC voltage from the AC supply voltage. The capacitor has a large enough capacitance for a relatively small ripple to be present at its terminals as compared to a DC level. Therefore the rectifier diodes of the bridge will only conduct over a short portion of each half cycle of the supply voltage, as the instantaneous value thereof is less than the voltage of the capacitor over most of the cycle. The result is the current absorbed from the power line consists of a series of short impulses the amplitude of which is 5-10 times the resulting average value.

This has significant consequences:

the current absorbed from the power line has peak and rms (root-mean-square) values much higher than the case of sinusoidal current absorption, the supply voltage is distorted due to the almost simultaneous impulse absorption of all utilities connected to the power line, the current in the neutral conductor in the case of three-phase systems is highly increased, and there is low use of the energy potential of the power system.

In fact, the waveform of impulse current includes many odd harmonics, which although do not contribute to the power provided to the load, they contribute to increasing the rms current absorbed by the power line and, therefore, to increasing the energy dissipation.

In quantitative terms, this may be expressed both in terms of power factor (PF), which is a ratio of the real power (the one the power supply sends to the load plus the one dissipated therein in the form of heat) to the apparent power (the product of the rms voltage by the rms current absorbed), and in terms of total harmonic distortion (THD), generally a percentage ratio of the energy associated with all larger harmonics to the one associated with the fundamental harmonic. Typically, a power supply with capacitance filter has a PF between 0.4 and 0.6 and a THD higher than 100%. A PFC arranged between the rectifier bridge and output allows a current quasi sinusoidal and phased with the voltage, to be absorbed from the network, thus making the PF close to 1 and decreasing the THD.

FIG. 1 shows a schematic of a single phase PFC converter 20 and a control device 22. The control device 22 may have a variable frequency and may operate between the continuous (CCM) and discontinuous (DCM) modes in what is commonly called "Transition Mode" (TM). An input voltage (Vin) is supplied to the converter 20 from a voltage supply terminal of a full-wave diode rectifier bridge 24. A second terminal of the rectifier bridge 24 is, in turn, connected to a ground terminal. The rectifier bridge 24 receives an input supply voltage provided by an alternating current (AC) power supply 26. The converter 20 may be implemented as a boost converter. The converter 20 comprises an inductance 28 of a transformer, a metal oxide semiconductor (MOS) power transistor 30, and a diode 32. A first terminal of the inductance 28 is connected to the voltage supply terminal of the rectifier bridge 24 and the drain terminal of the transistor 30 is connected to a second terminal of the inductance 28 downstream from the first terminal. The source terminal of the transistor 30, on the other hand, is connected to a ground terminal via a resistor 34.

The diode 32 has an anode connected to the second terminal of the inductance 28. Further, the diode 32 has a cathode connected to a first terminal of an output capacitor 36 having another terminal connected to a ground terminal. The converter 20 generates a direct current (DC) output voltage (denoted as Vout) across the output capacitor 36, whereby Vout is higher than the maximum peak voltage supply of Vin.

The control device 22 keeps the output voltage Vout at a constant value using feedback control. In transition mode, efficient switching is achieved by switching at zero voltage and zero current conditions. The control device 22 of FIG. 1 is shown to have four input ports and an output port. The four input ports include an input voltage port 38 that receives the input voltage provided by the rectifier bridge 24, an output voltage port 40 that receives the output voltage provided by the converter 20, a zero crossing detection (ZCD) port 42, and current sense (CS) port 44. The ZCD port 42 is electrically coupled to an auxiliary winding 46 of the transformer that includes the inductance 28 and is for sensing when the current through the inductance 28 reaches 0 Amperes. The CS port 44 is used to monitor the current through the transistor 30.

The output port 48 of the control device 22, which is a gate drive (GD) port, turns the transistor 30 on and off and thereby controls the operation of the converter 20. The control device 22 may be said to be a variable frequency control device because the both the frequency of switching the transistor 30, and, accordingly, the switching period, are based on external events triggered by the operation of the converter 20. Operational efficiency is achieved, however, by ensuring that the transistor 30 is turned on at near zero current of the inductance 28.

Furthermore, the control device 22 may be of a constant on-time (COT) type. In constant on-time operation, the turn-on period of the power transistor 30 of the converter 20 is used as a control variable and, during each cycle of voltage supply, it is kept constant at an appropriate value to obtain the regulation of the voltage output from the converter 20.

FIG. 2 shows timing diagrams of the signals of the circuit of FIG. 1 when Vin is less than half of Vout and greater than half of Vout. As may be viewed on the left side of the Figure, when Vin is less than half of Vout the transistor 30 is turned on for more than half of the length of the switching period, Tsw. The transistor 30 is turned off for the remainder of the switching period, however, by setting $V_{GS}$ (the gate voltage) to zero. The transistor 30 is turned back on again after a zero crossing condition is met (or ZCD voltage dropping below a threshold). Similar operation is shown on the right side of FIG. 2, where the on-time of the transistor 30 is shorter because the desired output voltage is less.

The converter 20 is characterized by a high current ripple through the inductance 28 and the input and output terminals. The current ripple may be significantly reduced in multiphase parallel converters where two converters, which may be implemented as a boost converters, are connected in parallel to provide an output voltage. The reduction of the current ripples results from operating the two parallel converters out of phase with respect to each other, whereby the ripples from the converters cancel out one another. The maximum reduction occurs when the boost converters are operated at a 180 degree phase difference.

FIG. 3 shows a schematic of an overall controller 60 comprising two converters 64a,b and a multiphase control device 62. Although two converters 64a,b are shown in FIG. 3, it is noted that a different number of converters may be used. Further, the converters 64a,b are similar to the converter 20 described with reference to FIG. 1, whereby each converter 64a,b may be a boost converter. The converters 64a,b are supplied with voltage via a rectifier bridge 24 connected to an AC power supply 26. The converters 64a,b are similarly configured as those of the converter 20, whereby each converter 64a,b comprises an inductance 66a,b of a transformer, a transistor 68a,b, a diode 70a,b, and a resistor 72a,b, respectively. Each transformer has an auxiliary winding 65a,b using which zero crossing conditions are detected.

Furthermore, the converters 64a,b are connected in parallel to both the DC voltage (Vin) output by the rectifier bridge 24 and to an output capacitor 36 across which the output voltage (Vout) is obtained.

The multiphase control device 62 controls the operation of the converters 64a,b by timing the turning on of the transistors 68a,b through gate drive ports 74a,b, respectively. It is noted that as an alternative to using one multiphase control device 62 to control both converters 64a,b multiple single phase control devices may be used for turning on the transistors 68a,b.

Conventional approaches to keeping the converters 64a,b completely out of sync and operating 180 degrees apart include allowing one converter (for example, first converter 64a) to operate as if it was a single phase converter. The first transistor 68a of the first converter 64a is switched on when zero crossing conditions of the inductance 66a are detected and switched off at a later time period.

Meanwhile, the second converter 64b is turned on at half of the switching period of the first converter 64a (i.e., half a cycle following switching on the first transistor 68a) independently of whether the second converter 64b has reached the zero crossing conditions. However, this approach has drawbacks because the second transistor 68b may be turned on when the current is not zero. Furthermore, it was observed that this approach may make certain conditions unstable.

Another conventional approach calls for utilizing a phase-locked loop (PLL) to keep the converters 64a,b synchronized to a 180 degree phase difference. A control device is used to detect the turn on instant of the converters 64a,b and if they are not 180 degrees apart, the PLL changes the on-time of the converters 64a,b to bring them back in phase. However, the PLL requires some time to lock particularly because the converters 64a,b are continually changing frequency.

BRIEF SUMMARY

A method may be summarized as including: delaying a first gate drive signal of a first boost converter by half a cycle length to produce a delayed signal; receiving a zero crossing detection (ZCD) signal of a second boost converter, the ZCD signal, when asserted, indicating that one or more zero current conditions of the second boost converter are met; determining whether to operate in a first mode or a second mode based on a timing of assertion of both the ZCD signal and the delayed signal; operating in the first mode if the ZCD signal is asserted prior to assertion of the delayed signal, operating in the first mode including asserting a second gate drive signal of the second boost converter upon assertion the delayed signal and asserting the first gate drive signal upon assertion of a ZCD signal of the first boost converter; operating in the second mode if the delayed signal is asserted prior to assertion of the ZCD signal, operating in the second mode including asserting the second gate drive signal upon assertion of the ZCD signal of the second boost converter and asserting the first gate drive signal half a cycle length after assertion of the second gate drive signal; and adjusting an on time of the first boost converter or the second boost converter based at least in part on a time difference between assertion of the ZCD signal of the second boost converter and the delayed signal.

The method may further include switching the operating modes in response to detecting that an order of assertion of the ZCD signal of the second boost converter and the delayed signal changes from one cycle to another cycle.

Delaying the first gate drive signal may further includes: determining a length of time of a switching period of the first boost converter as a difference in time between two consecutive switch on events of the first boost converter; and delaying the first gate drive signal by half the determined length of time. Adjusting the on time may further include reducing the on time of the second boost converter in the second mode of operation. Adjusting the on time may further include increasing the on time of the second boost converter in the first mode of operation. The first boost converter may include: an inductance having a first terminal, electrically coupled to a power supply terminal, and a second terminal; a first resistor; an output capacitor; a transistor having a drain terminal electrically coupled to the second terminal of the inductance, a source terminal electrically coupled via the resistor to ground, and gate configured to receive the second gate drive signal; and a first diode having an anode electrically coupled to the second terminal of the first inductance and a cathode electrically coupled to the output capacitor. The second boost converter may be electrically coupled in parallel to the first boost converter and may include: a second inductance having a first terminal, electrically coupled to the power supply terminal, and a second terminal; a second transistor having a drain terminal electrically coupled to the second terminal of the second inductance, a source terminal electrically coupled via the second resistor to ground, and gate configured to receive the first gate drive signal; and a second diode having an anode electrically coupled to the second terminal of the second inductance and a cathode electrically coupled to the output capacitor.

A system may be summarized as including: a first boost converter having a first power transistor; a second boost converter having a second power transistor; and a multi-phase controller including: a first stage controller configured to produce a first gate drive signal to turn on the first power transistor of the first boost converter; a delay element configured to produce a delayed signal by delaying the first gate drive signal by half a cycle length; a time difference detection element configured to in response to determining that a zero crossing detection (ZCD) signal is asserted prior to assertion of the delayed signal, output a turn on command that is a logical AND of the ZCD signal and the delayed signal, the ZCD signal, when asserted, indicating that one or more zero current conditions of the second boost converter are met; and in response to determining that the ZCD signal is not asserted prior to assertion of the delayed signal, output the turn on command that is the ZCD signal; and a second stage controller configured to: assert a second gate drive signal to turn on the second power transistor of the second boost converter in response to the turn on command.

The time difference detection element may be further configured to: determine a time difference between assertion of the ZCD signal and assertion of the delayed signal; and output the time difference.

The system of may further include an error control block configured to receive the time difference and compensate an on time of the first boost converter or the second boost converter based on the time difference and cause the first and second stage controllers to respectively drive the first boost converter and the second boost converter with half a cycle phase difference.

Adjusting the on time may further include increasing an on time of the second boost converter. The first boost converter may further include: a first inductance having a first terminal, electrically coupled to a power supply terminal, and a second terminal; an output capacitor; a first diode having an anode electrically coupled to the second terminal of the first inductance and a cathode electrically coupled to the output capacitor; and a first resistor; and wherein the first power transistor has a drain terminal electrically coupled to the second terminal of the first inductance, a source terminal electrically coupled via the first resistor to ground, and a gate electrically coupled to the first stage controller for receiving the first gate drive signal; and the second boost converter may further include: a second inductance having a first terminal, electrically coupled to the power supply terminal, and a second terminal; a second diode having an anode electrically coupled to the second terminal of the second inductance and a cathode electrically coupled to the output capacitor; and a second resistor; and wherein the second power transistor has a drain terminal electrically coupled to the second terminal of the second inductance, a source terminal electrically coupled via the second resistor to ground, and gate electrically coupled to the second stage controller for receiving the second gate drive signal.

A controller for a multiphase converter may be summarized as including: a first stage controller configured to produce a first gate drive signal to turn on a first power transistor of a first boost converter of the multiphase converter; a delay element configured to produce a delayed signal by delaying the first gate drive signal by half a cycle length; a time difference detection element configured to: in response to determining that a zero crossing detection (ZCD) signal is asserted prior to assertion of the delayed signal, output a turn on command that is a logical AND of ZCD signal and the delayed signal, the ZCD signal, when asserted, indicating that one or more zero current conditions of a second boost converter of the multiphase converter are met; and in response to determining that the ZCD signal is not asserted prior to assertion of the delayed signal, output a turn on command that is the ZCD signal; and a second stage controller configured to: assert a second gate drive signal to turn on a second power transistor of the second boost converter based on the turn on command.

The time difference detection element may be further configured to: determine a time difference between assertion of the ZCD signal and assertion of the delayed signal; and output the time difference.

The controller may further include an error control block configured to receive the time difference and compensate an on time of the first boost converter or the second boost converter based on the time difference and cause the first and second stage controllers to respectively drive the first boost converter and the second boost converter with half a cycle phase difference.

Compensating the on time of the first boost converter may further include increasing the on time of the first boost converter.

The controller may further include a first output port configured to output the first gate drive signal to the first boost converter; and a second output port configured to output the second gate drive signal to a second boost converter.

The first boost converter and the second boost converter may be electrically coupled in parallel. The first boost converter may include: a first inductance having a first terminal, electrically coupled to a power supply terminal, and a second terminal; a first resistor; an output capacitor; and a first transistor having a drain terminal electrically coupled to the second terminal of the first inductance, a source terminal electrically coupled via the first resistor to ground, and a gate electrically coupled to the second output port for the second gate drive signal, and a first diode having an anode electrically coupled to the second terminal of the first inductance and a cathode electrically coupled to the output capacitor. The second boost converter may include: a second inductance having a first terminal, electrically coupled to the power supply terminal, and a second terminal; a second resistor; a second transistor having a drain terminal electrically coupled to the second terminal of the second inductance, a source terminal electrically coupled via the second resistor to ground, and gate electrically coupled to the first output port for receiving the first gate drive signal; and a second diode having an anode electrically coupled to the second terminal of the second inductance and a cathode electrically coupled to the output capacitor.

DETAILED DESCRIPTION

Figure 4:
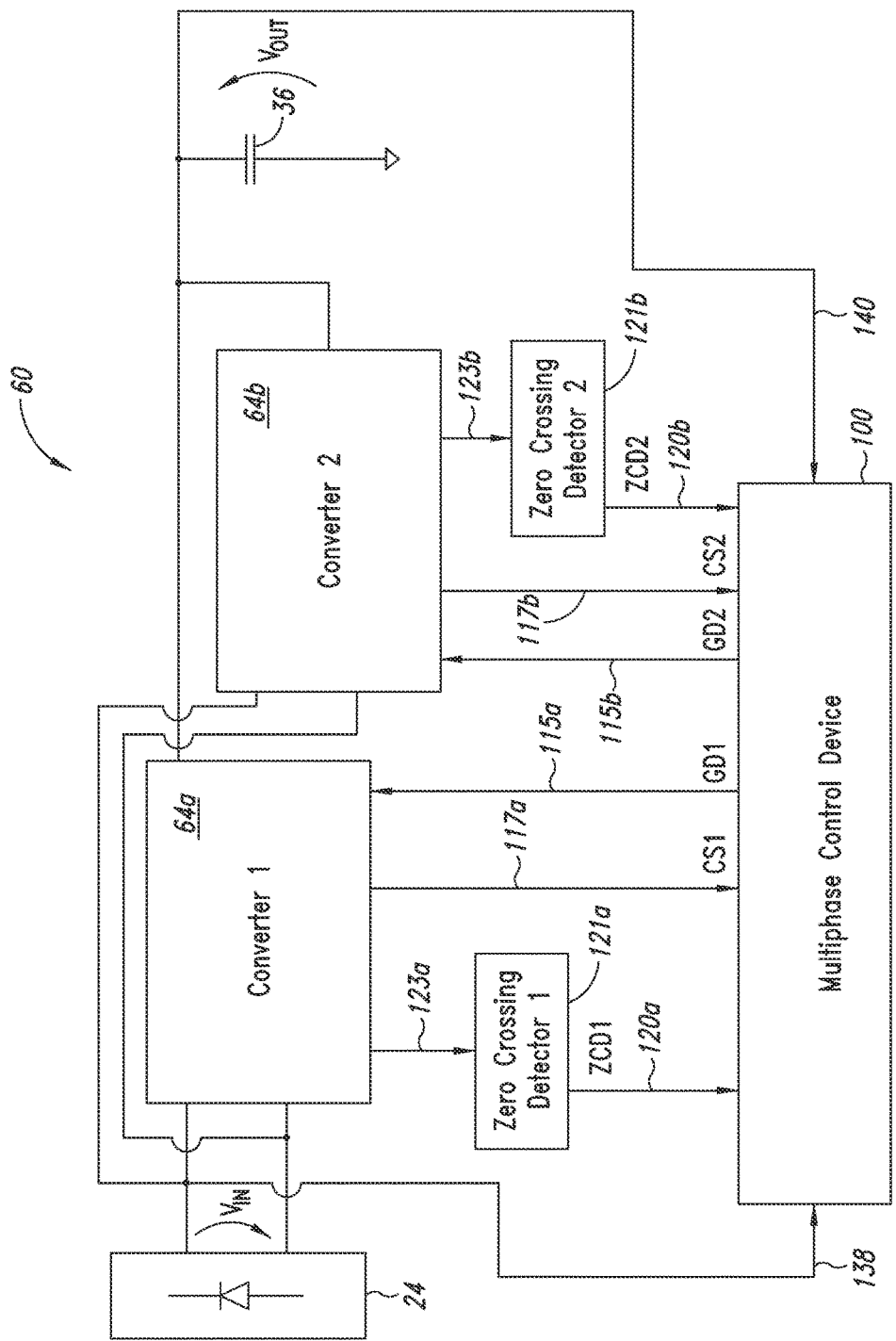
FIG. 4 shows a schematic of an overall controller comprising two converters and a multiphase control device.

FIG. 4 shows a schematic of an overall controller 60 comprising two converters 64a,b and a multiphase control device 100. The two converters 64a,b are connected in parallel and receive an input voltage signal 138. The input voltage signal 138 is the same as Vin that is output by the rectifier 24. The converters 64a,b generate a direct current (DC) output voltage (denoted as Vout) across the output capacitor 36. The multiphase control device 100 receives both an output voltage signal 140 of the output voltage (Vout) as well as the input voltage signal 138. For each converter 64a,b, the multiphase control device 100 receives a ZCD signal 120a,b from a respective ZCD detector 121a,b. The ZCD detector 121a,b may be any device, such as a comparator, that receives an input signal 123a,b from a respective converter 64a,b and determines, based at least in part on the input signal 123a,b and another signal that, for example, represents a threshold, whether zero current conditions of the respective converter 64a,b are met. The input signal 123a,b may be drawn or sourced from the auxiliary winding 65a,b of the respective converter 64a,b. The ZCD signal 120a,b output by the ZCD detector 121a,b may be asserted when the zero crossing conditions of the respective inductance 66a,b are met.

The multiphase control device 100 also receives, for each converter 64a,b, a current sense signal 117a,b. As described herein, the current sense signal 117a,b corresponds to the current through the respective transistor 68a,b of the respective converter 64a, 64b and is used to eliminate negative currents in the respective inductor 66a,b. The multiphase control device 100 outputs a gate drive signal 115a,b for each converter 115a,b.

Figure 1:
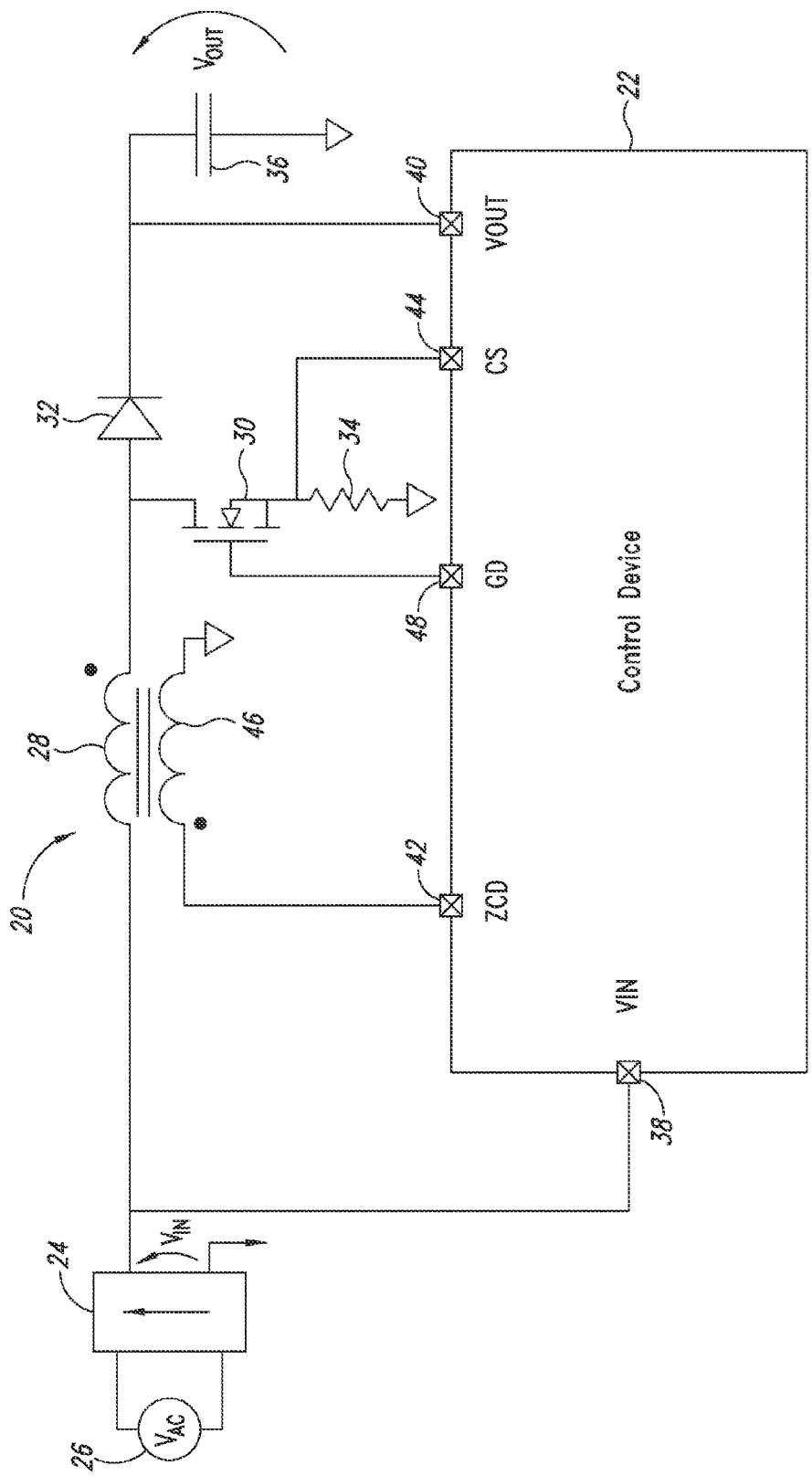
FIG. 1 shows a schematic of a single phase PFC converter and a control device.
Figure 2:
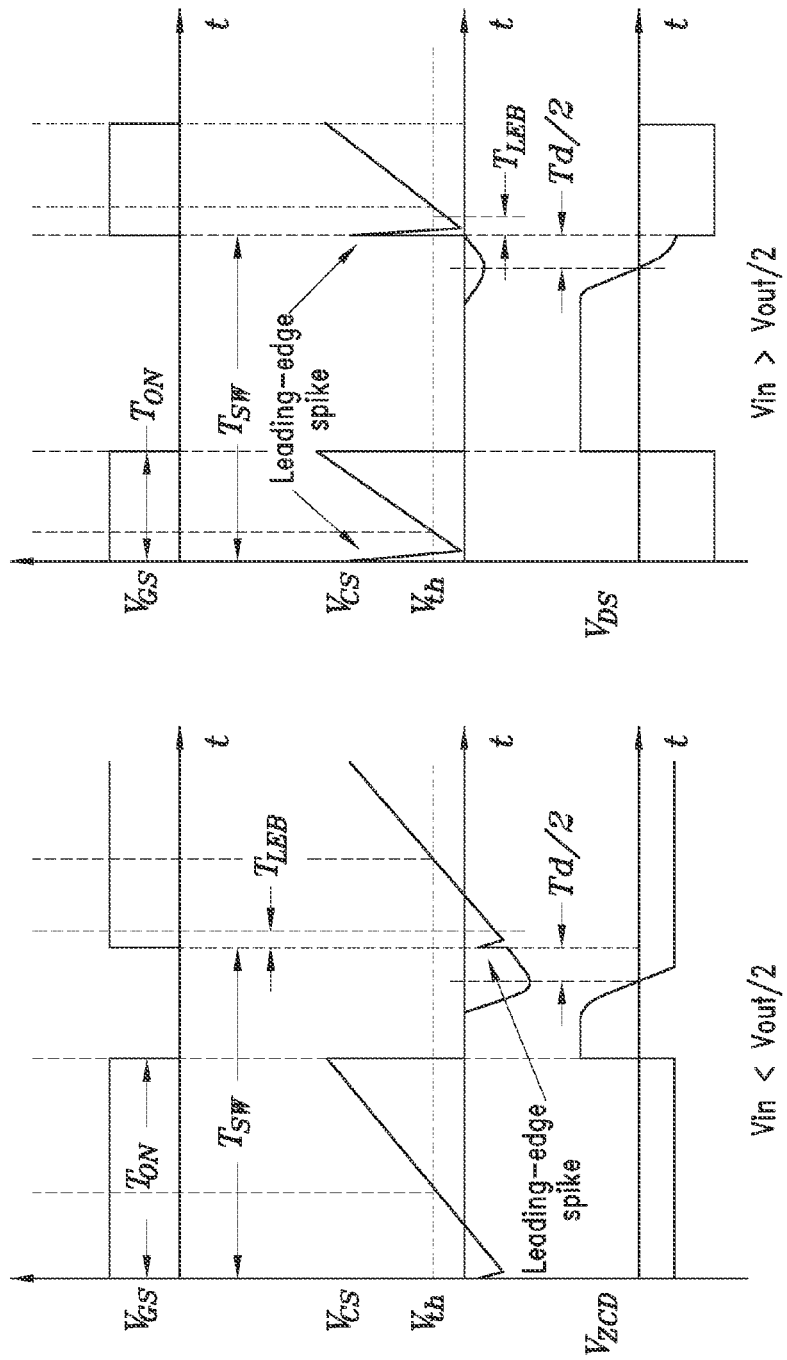
FIG. 2 shows timing diagrams of the signals of the circuit of FIG. 1 when Vin is less than half of Vout and greater than half of Vout.
Figure 3:
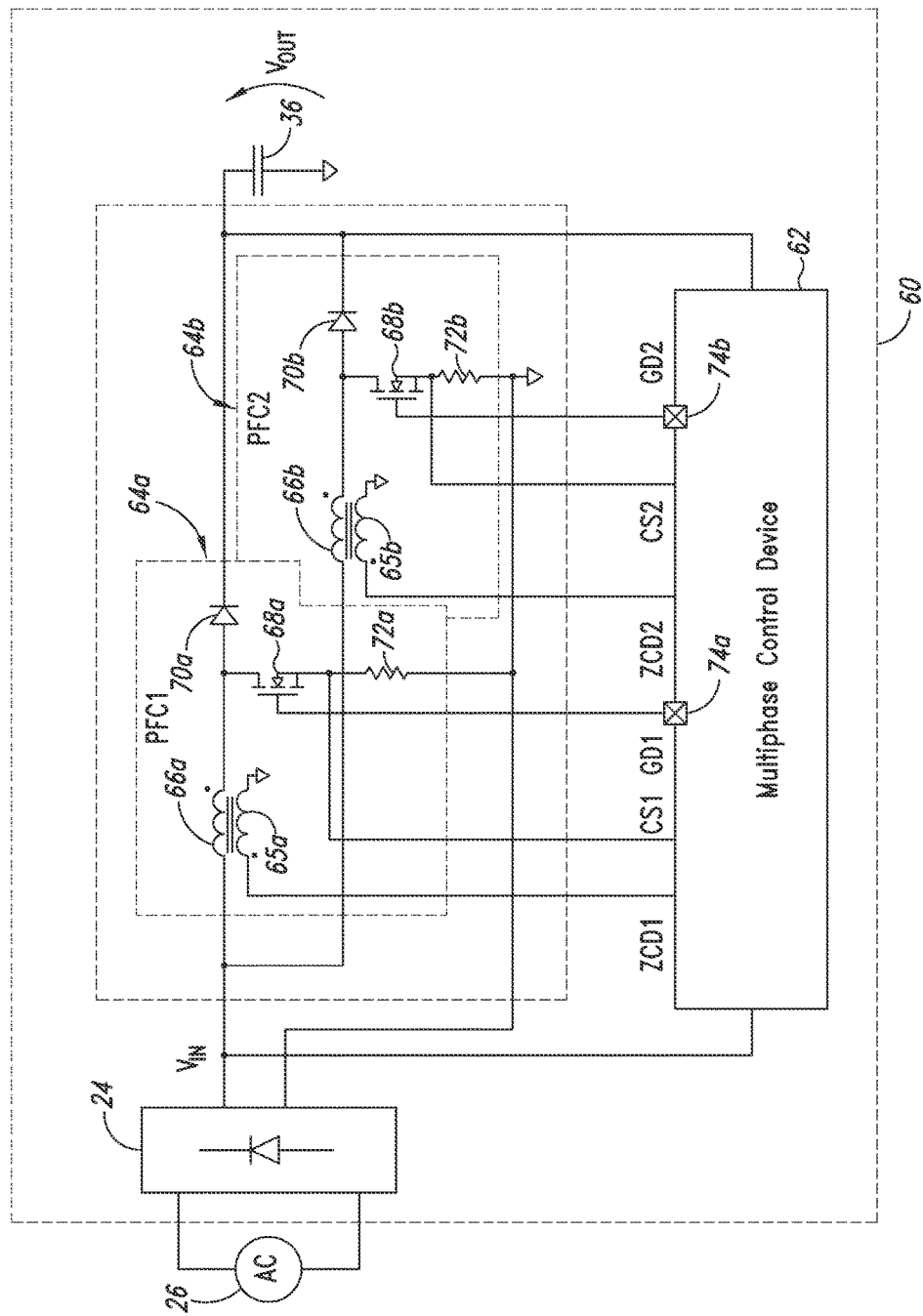
FIG. 3 shows a schematic of an overall controller comprising two converters and a multiphase control device.
Figure 5:
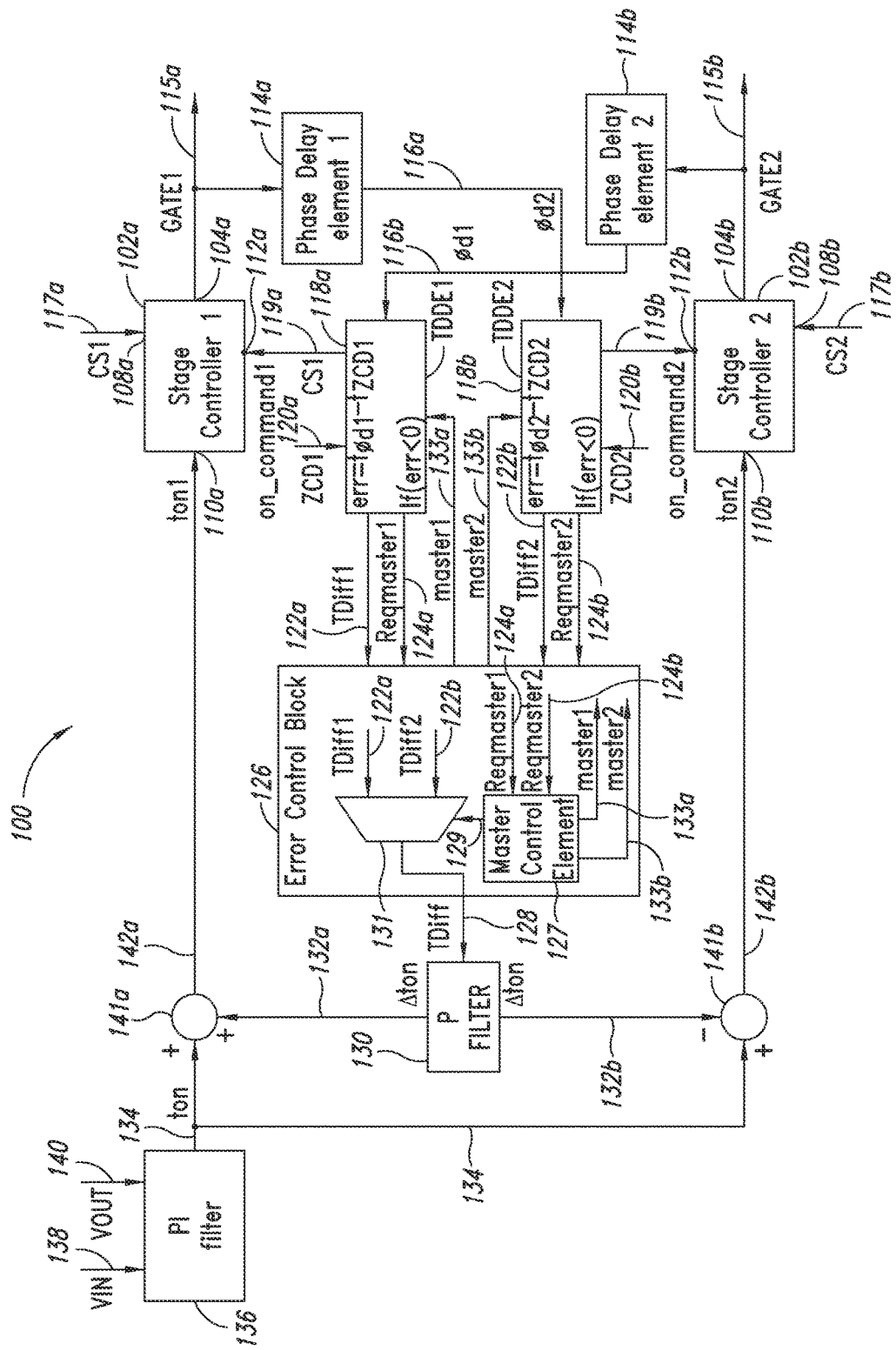
FIG. 5 shows a block diagram of the multiphase control device.

FIG. 5 shows a block diagram of the multiphase control device 100. For convenience the multiphase control device 100 is also referred to hereinafter as the controller 100. The controller 100 comprises a first boost stage controller 102a (denoted as "stage controller 1") and a second boost stage controller 102b (denoted as "stage controller 2"). The stage controllers 102a,b each have a plurality of input ports and a gate drive output port 104a,b that turns on and off the respective transistors 68a,b of the two converters 64a,b described with reference to FIG. 3.

The plurality of input ports include first and second current sense ports 108a,b. The current sense port 108a,b is used to receive the current sense signal 117a,b described herein. The stage controllers 102a,b each have a respective time-on input port 110a,b and on-command port 112a,b. The on-command port 112a,b receives a respective turn on command 119a,b from a respective time difference detection element 118a,b that is described herein. When asserted the turn on command 119a,b may trigger asserting the gate drive output 115a,b to turn on a respective one of the converters 64a,b. The time-on input port 110a,b receives a respective on-time signal 142a,b indicating a desired on-time of a respective one of the converters 64a,b.

The stage controllers have respective phase delay elements 114a,b that are denoted as "Phase delay element 1" and "Phase delay element 2", respectively. The phase delay elements 114a,b respectively receive the gate drive signals 115a,b used to drive the respective converters 64a,b and delay the respective gate drive signal 115a,b to respectively produce a first delayed signal 116a and a second delayed signal 116b. The phase delay elements 114a,b may observe the switching period of the respective gate drive signal 115a,b. Observing the switching period may include measuring or estimating the switching period. The first phase delay elements 114a outputs the first delayed signal 116a to be delayed by half the observed switching period with respect the first drive signal 115a. Similarly, the second phase delay elements 114b outputs the second delayed signal 116b, whereby the second delayed signal 116b may be delayed, with respect the second drive signal 115b, by half the switching period of the second drive signal 115b. A length of the switching period may be a time difference between two consecutive assertions of the respective gate drive signal 115a,b.

Operation of the second converter 64b is controlled based at least in part on the first gate drive signal 115a and vice-versa. As shown in FIG. 5, the first phase delay element 114a outputs the first delayed signal 116a to a second time difference detection element 118b for controlling the operation of the second converter 64b. Similarly, the second phase delay element 114b outputs the second delayed signal 116b to a first time difference detection element 118b for controlling the operation of the first converter 64a,b As shown in FIG. 5, the first time difference detection element 118a is coupled to the second delay element 114b and the second time difference detection element 118b is coupled to the first delay element 114a. As such, the first delayed signal 116a is provided to the second time difference detection element 118b and the second delayed signal 116b is provided to the first time difference detection element 118a. The first time difference detection element 118a compares the second delayed signal 116b to a first ZCD signal 120a. When asserted, the first ZCD signals 120a indicates that the respective currents through the inductance 66a has crossed zero. The first ZCD signals 120a is asserted based at least in part on a voltage reading from the auxiliary winding 65a of the first converter 64a, whereby the auxiliary winding 65a is used for detecting the current level of the inductance 66a of the first converter 64a.

The first time difference detection element 118a evaluates whether the second delayed signal 116b is asserted before or after the first ZCD signal 120a. Similarly, the second time difference detection element 118b compares the first delayed signal 116a to a second ZCD signal 120b and evaluates whether the first delayed signal 116a is asserted before or after the second ZCD signal 120b. Similar to the first ZCD signal 120a, the second ZCD signal 120b, when asserted, indicates that the respective current through the inductance 66b has crossed zero. The second ZCD signal 120b is asserted based at least in part on a voltage reading from the auxiliary winding 65b of the second converter 64b, whereby the auxiliary winding 65b is used for detecting the current level of the inductance 66b of the second converter 64b.

When the first converter 64a and the second converter 64b are 180 degrees out of phase, the ZCD signal 120a,b of one converter is expected to occur exactly 180 degrees after the assertion of the gate drive signal 115a,b of the other converter. That is, one converter may be driven, under optimal conditions, exactly half a cycle after the other converter was driven. Comparing the ZCD signal 120a,b of each converter 64a,b with the delayed signal 116b,a of the other converter 64b,a, at each time difference detection element 118a,b, serves to indicate whether the ZCD signal 120a,b was asserted earlier or later than expected.

If one of the time difference detection elements 118a,b detects that a zero current condition in the inductance 66a,b of its respective converter 64a,b occurs after the assertion of the delayed signal 116b,a of the other converter, the converter 64a,b may be switched on in response to detecting the zero current condition. Further, that converter may be deemed as a "master" as it leads the switch on timing. Further, the other converter may be deemed a "slave" as it derives its timing from the switch on timing of the master.

Conversely, if one of the ZCD signals 120a,b are asserted prior to the assertion of the delayed signal 116b,a, of the other boost converter, switching is performed in response to assertion of the delayed signal 116a,b to keep the two converters as out-of-phase as possible. The converter 64a,b whose corresponding time difference detection element 118a,b detects that the ZCD signal 120a,b is asserted prior to the delayed signal 116b,a is designated a "slave" converter. That is because its timing is derived from the timing of the "master" as opposed its own zero current condition. It is noted that awaiting the assertion of the delayed signal 116a,b does not negatively impact efficiency as zero current conditions remain for some time following their detection.

In the case that the time difference detection elements 118a,b identifies that its associated converter 64a,b is a "slave" converter, the time difference detection element 118a,b outputs the respective turn on command 119a,b as the logical AND of the respective ZCD signal 120a,b and the respective delayed signal 116b,a received by the time difference detection elements 118a,b. The respective stage controller 102a,b receives the respective on command 119a,b. The stage controller 102a,b turns on the respective converter 64a,b by asserting the gate drive signal 115a,b in response to receiving the turn on command 119a,b. Accordingly, the "slave" converter is turned on when both the respective ZCD signal 120a,b and the respective delayed signal 116b,a are asserted. If the associated boost converter 64a,b is determined to be a "master," the outputted turn on command 119a,b follows the ZCD signal 120a,b. The gate drive signal 115a,b is asserted in response to assertion of the ZCD signal 120a,b.

The time difference detection elements 118a,b output respective time difference signals 122a,b indicating the difference in time between the assertions. Furthermore, the time difference detection elements 118a,b also output respective master request signals 124a,b. The master request signal 124a,b is asserted by the time difference detection element 118a,b if its corresponding converter 64a,b is to be made "master" as described herein. That is, a master request signal 124a,b is asserted if the respective time difference detection element 118a,b detects that the ZCD signal 120a,b is asserted after assertion of the delayed signal 116b,a (or the zero crossing detection signal 120a,b has arrived late). The master boost converter is characterized in that it is turned on and off in accordance with normal operation, i.e., upon detection of the zero crossing condition. The "slave" converter, conversely, follows the "master" by 180 degrees. The "slave" converter is characteristically turned on 180 degrees following the turning on of the "master".

The time difference detection elements 118a,b provide the time difference signals 122a,b and the master request signals 124a,b to an error control block 126. The error control block 126 identifies the master converter based at least in part on whether the first master request signal 124a or the second master request signal 124b is asserted. As shown in FIG. 5, a master control element 127 included in the error control block 126 receives the first master request signal 124a and the second master request signal 124b. The master control element 127 outputs, based at least in part on the first master request signal 124a and the second master request signal 124b, a selection signal 129 to a multiplexer 131. The selection signal 129 serves to select between the first time difference signal 122a and the second time difference signal 122b for outputting. The multiplexer 131 outputs as a time difference offset signal 128 that is either the first time difference signal 122a or the second time difference signal 122b based on the selection signal 129. The error control block 126 outputs the time difference signal of the "slave" converter (i.e., the converter whose corresponding master request signal 124a,b is not asserted).

In response to receiving the master request signals 124a,b, the master control element 127 outputs a first master confirmation signal 133a to the first time difference detection element 118a and a second master confirmation signal 133b to the second time difference detection element 118b. The master confirmation signals 133a,b, when asserted, indicate to the respective time difference detection element 118a,b that the element's corresponding converter 64a,b is a master.

The master confirmation signals 133a,b resolve potential clashes between the master request signals 124a,b. Receipt of an asserted master confirmation signal 133a,b indicates to the time difference detection element 118a,b whether the respective converter 64a,b is a master or slave and, accordingly, triggers outputting the respective turn on command 119a,b by the time difference detection element 118a,b.

As shown in FIG. 5, the error control block 126 outputs the time difference offset signal 128 to a proportional filter 130. The time difference offset signal 128 is the measured time difference between assertion of the delayed signal and the ZCD signal of the "slave" boost converter as described herein. For example, if the first master request signal 124a is asserted, the outputted offset signal 128 is the second time difference signal 122b received from the second time difference detection element 118b.

The proportional filter 130 may be a proportional integral filter and may compensate the time difference offset signal 128. For example, the proportional filter 130 may multiply the time difference offset signal 128 by a factor. The proportional filter 130 outputs two compensation signals 132a,b as shown in FIG. 5. The first compensation signal 132a may be used to compensate the on-time of the first converter 64a and increase or decrease the on-time of the first converter 64a to bring the two converters 64a,b closer to a 180 degree phase difference. Similarly, the second first compensation signal 132b may be used to decrease or increase the on-time of the second boost 64b to bring the two converters 64a,b closer to a 180 degree phase difference. In various embodiments, however, the on-time of only one converter rather than both may be adjusted based on a compensation signal.

As shown in FIG. 5, a Pi filter 136 outputs an on-time signal 134 for the two converters 64a,b based at least in part on the input voltage signal 138 and the output voltage signal 140 of the converters 64a,b. A first adder 141a receives the on-time signal 134 and the first compensation signals 132a and outputs the first on-time signal 142a to compensate the on time of the first converter 64a. Similarly, a second first adder 141b receives the on-time signal 134 and the second compensation signals 132b and outputs the second on-time signal 142b to compensate the on time of the second converter 64b.

In accordance with the controller of FIG. 5, interleaving switching on the "slave" converter at a half cycle offset from switching on the "master" converter results cycle-by-cycle control of the multiphase converters 64a,b. Conversely, adjusting the on-time of at least one of the multiphase converters 64a,b based on the time difference between the assertion of the ZCD signal and delay signal of the "slave" converter results in long term conversion of the turn on event of the two converters 64a,b to be 180 degrees apart.

Figure 6:
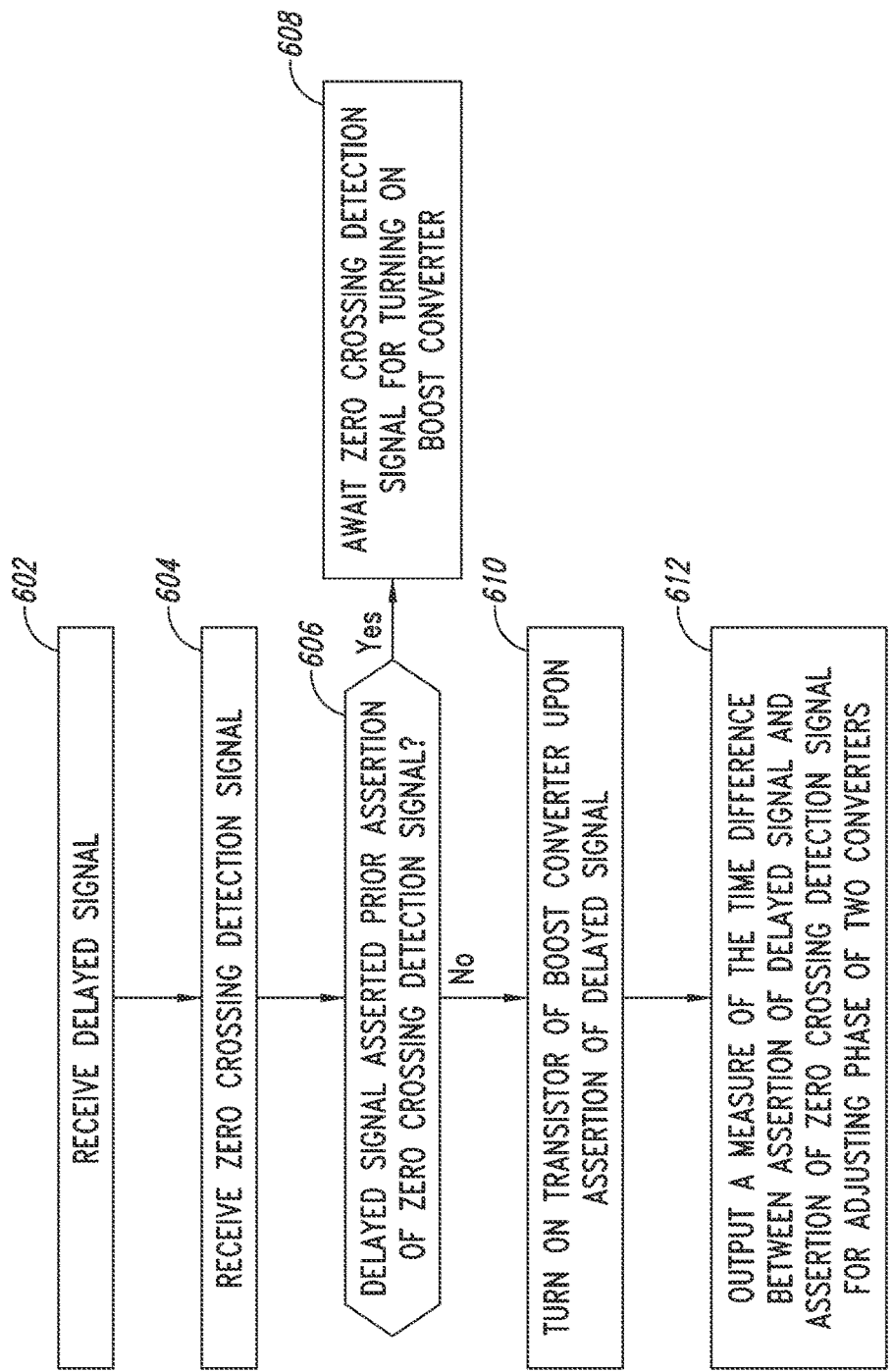
FIG. 6 shows a flow diagram of the method of operation of the time difference detection elements.

FIG. 6 shows a flow diagram of the method of operation of the time difference detection elements 118a,b. To facilitate understanding, the operation of the first time difference detection element 118a is described the operation is equally applicable to the second time difference detection element 118b. The first time difference detection element 118a receives, at step 602, the delayed signal 116b that, when asserted, indicates that the gate of the second boost converter 64b was turned on. The delayed signal indicates the expected timing of the turning on of the first boost converter 64a assuming that the two boost converters are operationally maximally spaced with a 180 degree phase therebetween.

The first time difference detection element 118a also receives, at step 604, the first zero current detection signal 120a of the first boost converter 64a. When the first zero current detection signal 120a is asserted, desired conditions for driving the gate of the first boost converter 64*a* are deemed to have occurred and the transistor 68*a* may be optimally switched on. The first time difference detection element 118*a* determines, at step 606, whether the delayed signal 116*a* is asserted before the assertion of the zero crossing detection signal 120*a*. If a positive determination is made, it may be premature to drive the gate of the first boost converter 64*a* because zero current conditions that are optimal for switching have not been met. Accordingly, the transistor 68*a* of the first boost converter 64*a* is asserted after the assertion of the zero crossing detection signal 120*a* in step 608. The first boost converter 64*a* is, thus, designated as a master boost converter that will dictate the timing of the switching of the second boost converter 64*b* occurring half a period later.

Conversely, if the first time difference detection element 118*a* determines 606 that the delayed signal 116*a* is asserted after the assertion of the zero crossing detection signal 120*a*, then the transistor 68*a* of the first boost converter 64*a* is turned on, in step 610, in response to detection of assertion of the delayed signal 116*a*. Because the turn on instant of the first boost converter 64*a* was dictated by the delayed signal 116*b* (i.e., the half cycle delayed turn on instant of the second boost converter 64*b*), the first boost converter 64*a* is deemed as a slave converter. Furthermore, because in this case zero current conditions have occurred, the switching will be performed efficiently.

The first time difference detection element 118*a* then outputs, in step 612, a measure of the time difference between assertion of the second delayed signal 116*b* and assertion of the first ZCD signal 120*a* for adjusting the phase of the two converters as described herein. The measure of the time difference will be used for fine-tuning the turn on intervals of the boost converters so that they become 180° out of phase. Because in optimal operation, the 180 degree phase delay signal 116*a* should be asserted near the same time as assertion of the first ZCD signal 120*a*, the detected time difference between them is used for adjusting the on-time of the two stage controller 102*a,b* as described herein.

Figure 7:
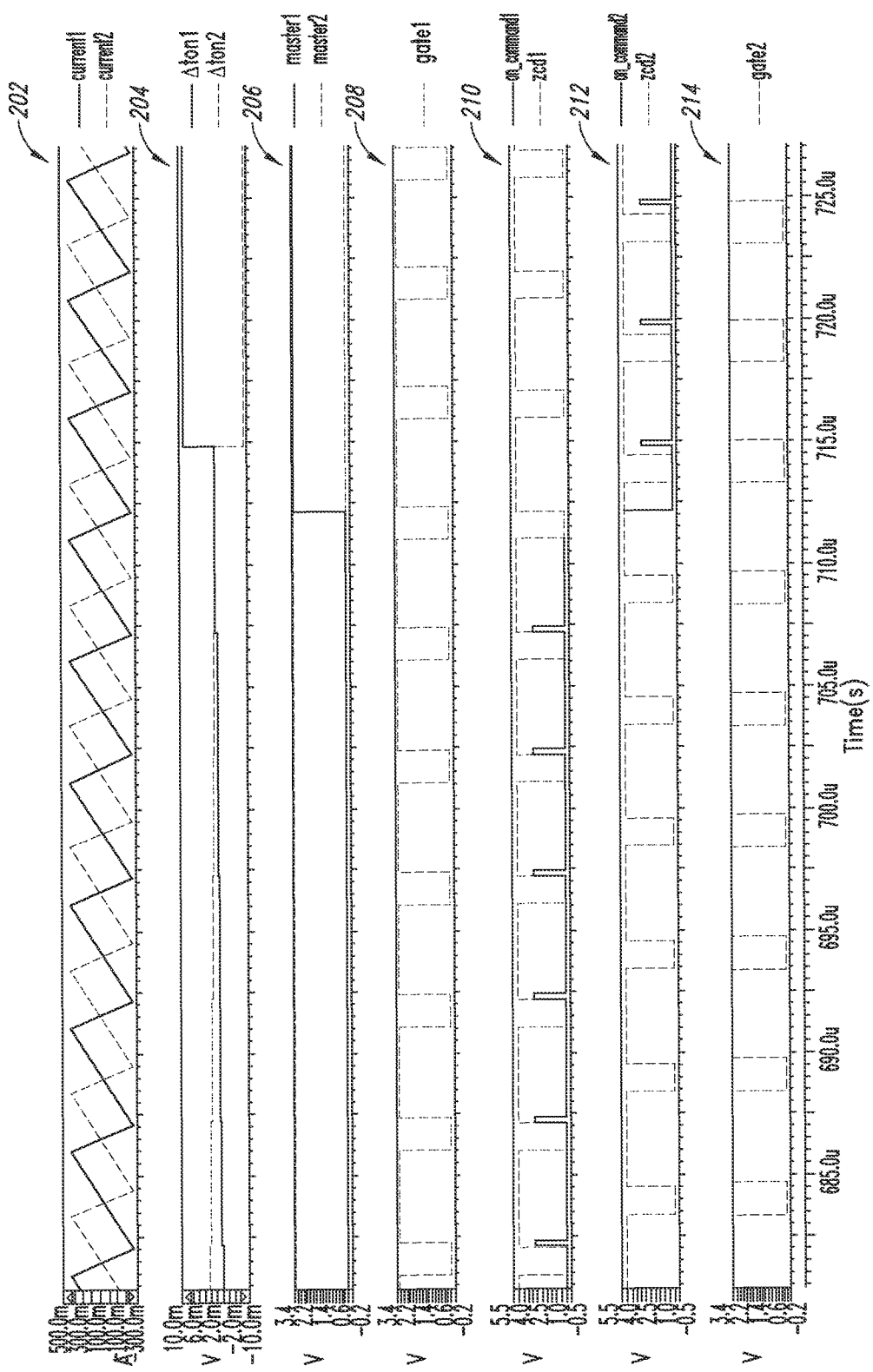
FIG. 7 shows timing diagrams of signals of the controller described with reference to FIG. 5.

FIG. 7 shows timing diagrams of signals of the controller described with reference to FIG. 5. Diagram 202 shows timing diagrams of the current of the first inductance 66*a* of the first converter 64*a* and the second inductance 66*b* of the second converter 64*b*. Initially, the second converter 64*b* is designated as "master" and its associated master signal is asserted in timing diagram 206. When the second converter 64*b* is the master, its gate drive signal 115*b* is asserted (diagram 214) based on the assertion of the second ZCD signal 120*b* (diagram 212). Meanwhile, the first gate drive signal 115*a* (diagram 208) of the slave converter, which is the first converter 64*a*, is asserted based on the first turn on command 119*a* as seen in diagram 210. The first turn on command 119*a* may be the logical AND of the delayed signal 116*a* (which is a 180 degree phase delayed from the second gate drive signal 115*b*) and the ZCD signal 120*a* of the first converter 64*a*.

As seen in diagram 210, at some point the first ZCD signal 120*a* arrives late (i.e., it is asserted after the delayed signal 116*b*). Accordingly, roles of the converters 64*a,b* are reversed. The first converter 64*a* may be designated as a master and the second converter 64*b* may be designated as a slave. Thereafter, the master signal of the first converter 64*a* is asserted and the master signal of the second converter 64*b* is de-asserted (diagram 206). Further, the first gate drive signal 115*a* of the first converter 64*a* is asserted based on its ZCD signal 120*a* (diagrams 208 and 210). Conversely, the second gate drive signal 115*b* is only asserted after both its ZCD signal 120*b* and the delayed signal 116*a* are asserted. As shown in diagrams 212 and 214, the second gate drive signal 115*b* is asserted in response to the second turn on command 119*b*, whereby the second turn on command 119*b* is the logical AND of the delayed signal 116*a* and second ZCD signal 120*b*. Also shown in diagram 204 of FIG. 7 are the compensation signals 132*a,b* that are used to adjust the on-time of the two converters 64*a,b* to make their switch on events optimally spaced. The magnitude of compensation steadily decreases while the master and slave roles of the converters 64*a,b* are retained. When the roles are switched the magnitude of compensation jumps and begins to steadily decrease thereafter.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   delaying a first gate drive signal of a first boost converter by half a cycle length to produce a delayed signal;
   receiving a zero crossing detection (ZCD) signal of a second boost converter, the ZCD signal, when activated, indicating that one or more zero current conditions of the second boost converter are met;
   determining whether to operate in a first mode or a second mode based on a timing of activation of both the ZCD signal and the delayed signal;
   operating in the first mode if the ZCD signal is activated prior to activation of the delayed signal, operating in the first mode including activating a second gate drive signal of the second boost converter upon activation the delayed signal and activating the first gate drive signal upon activation of a ZCD signal of the first boost converter thereby maintaining the first boost converter as a master converter and the second boost converter as a slave converter;
   operating in the second mode if the delayed signal is activated prior to activation of the ZCD signal, operating in the second mode including activating the second gate drive signal upon activation of the ZCD signal of the second boost converter and activating the first gate drive signal half a cycle length after activation of the second gate drive signal thereby making the second boost converter the master converter and the first boost converter the slave converter; and
   adjusting an on time of the first boost converter or the second boost converter based at least in part on a time difference between activation of the ZCD signal of the second boost converter and the delayed signal.

2. The method of claim 1, comprising switching the operating modes in response to detecting that an order of activation of the ZCD signal of the second boost converter and the delayed signal changes from one cycle to another cycle.

3. The method of claim 1, wherein delaying the first gate drive signal further includes:

determining a length of time of a switching period of the first boost converter as a difference in time between two consecutive switch on events of the first boost converter; and delaying the first gate drive signal by half the determined length of time.

4. The method of claim 1, wherein adjusting the on time further includes reducing the on time of the second boost converter in the second mode of operation.

5. The method of claim 1, wherein adjusting the on time further includes increasing the on time of the second boost converter in the first mode of operation.

6. The method of claim 1, wherein the first boost converter comprises:
an inductance having a first terminal, electrically coupled to a power supply terminal, and a second terminal;
a first resistor;
an output capacitor;
a transistor having a drain terminal electrically coupled to the second terminal of the inductance, a source terminal electrically coupled via the resistor to ground, and gate configured to receive the second gate drive signal; and
a first diode having an anode electrically coupled to the second terminal of the first inductance and a cathode electrically coupled to the output capacitor.

7. The method of claim 6, wherein the second boost converter is electrically coupled in parallel to the first boost converter and comprises:
a second inductance having a first terminal, electrically coupled to the power supply terminal, and a second terminal;
a second transistor having a drain terminal electrically coupled to the second terminal of the second inductance, a source terminal electrically coupled via the second resistor to ground, and gate configured to receive the first gate drive signal; and
a second diode having an anode electrically coupled to the second terminal of the second inductance and a cathode electrically coupled to the output capacitor.

8. A system, comprising:
a first boost converter having a first power transistor;
a second boost converter having a second power transistor; and
a multiphase controller comprising:
a first stage controller configured to produce a first gate drive signal to turn on the first power transistor of the first boost converter;
a delay element configured to produce a delayed signal by delaying the first gate drive signal by half a cycle length;
a time difference detection element configured to:
in response to determining that a zero crossing detection (ZCD) signal is activated prior to activation of the delayed signal, output a turn on command that is a logical AND of the ZCD signal and the delayed signal thereby making the second boost converter a slave converter, the ZCD signal, when activated, indicating that one or more zero current conditions of the second boost converter are met; and
in response to determining that the zero crossing detection ZCD signal is not activated prior to activation of the delayed signal, output a turn on command that is the ZCD signal thereby making the second boost converter a master converter; and a second stage controller configured to activate a second gate drive signal to turn on the second power transistor of the second boost converter in response to the turn on command.

9. The system of claim 8, wherein the time difference detection element is further configured to:
determine a time difference between activation of the ZCD signal and activation of the delayed signal; and
output the time difference.

10. The system of claim 9, further comprising:
an error control block configured to receive the time difference and compensate an on time of the first boost converter or the second boost converter based on the time difference and cause the first and second stage controllers to respectively drive the first boost converter and the second boost converter with half a cycle phase difference.

11. The system of claim 10, wherein adjusting the on time further includes increasing an on time of the second boost converter.

12. The system of claim 8, wherein:
the first boost converter further comprises:
a first inductance having a first terminal, electrically coupled to a power supply terminal, and a second terminal;
an output capacitor;
a first diode having an anode electrically coupled to the second terminal of the first inductance and a cathode electrically coupled to the output capacitor; and
a first resistor; and
wherein the first power transistor has a drain terminal electrically coupled to the second terminal of the first inductance, a source terminal electrically coupled via the first resistor to ground, and a gate electrically coupled to the first stage controller for receiving the first gate drive signal; and
the second boost converter further comprises:
a second inductance having a first terminal, electrically coupled to the power supply terminal, and a second terminal;
a second diode having an anode electrically coupled to the second terminal of the second inductance and a cathode electrically coupled to the output capacitor; and
a second resistor; and
wherein the second power transistor has a drain terminal electrically coupled to the second terminal of the second inductance, a source terminal electrically coupled via the second resistor to ground, and gate electrically coupled to the second stage controller for receiving the second gate drive signal.

13. A controller for a multiphase converter, comprising:
a first stage controller configured to produce a first gate drive signal to turn on a first power transistor of a first boost converter of the multiphase converter;
a delay element configured to produce a delayed signal by delaying the first gate drive signal by half a cycle length;
a time difference detection element configured to:
in response to determining that a zero crossing detection (ZCD) signal is activated prior to activation of the delayed signal, output a turn on command that is a logical AND of the ZCD signal and the delayed signal thereby designating the second boost converter a slave converter, the ZCD signal, when activated, indicating that one or more zero current conditions of a second boost converter of the multiphase converter are met; and in response to determining that the ZCD signal is not activated prior to activation of the delayed signal, output a turn on command that is the ZCD signal thereby designating the second boost converter a master converter; and a second stage controller configured to activate a second gate drive signal to turn on a second power transistor of the second boost converter in response to the turn on command.

14. The controller of claim 13, wherein the time difference detection element is further configured to:

determine a time difference between activation of the ZCD signal and activation of the delayed signal; and output the time difference.

15. The controller of claim 14, further comprising:

an error control block configured to receive the time difference and compensate an on time of the first boost converter or the second boost converter based on the time difference and cause the first and second stage controllers to respectively drive the first boost converter and the second boost converter with half a cycle phase difference.

16. The controller of claim 15, wherein compensating the on time of the first boost converter further includes increasing the on time of the first boost converter.

17. The controller of claim 13, further comprising:

a first output port configured to output the first gate drive signal to the first boost converter; and a second output port configured to output the second gate drive signal to a second boost converter.

18. The controller of claim 17, wherein the first boost converter and the second boost converter are electrically coupled in parallel.

19. The controller of claim 18, wherein the first boost converter comprises:

a first inductance having a first terminal, electrically coupled to a power supply terminal, and a second terminal;

a first resistor;

an output capacitor; and a first transistor having a drain terminal electrically coupled to the second terminal of the first inductance, a source terminal electrically coupled via the first resistor to ground, and a gate electrically coupled to the second output port for the second gate drive signal, and a first diode having an anode electrically coupled to the second terminal of the first inductance and a cathode electrically coupled to the output capacitor.

20. The controller of claim 19, wherein the second boost converter comprises:

a second inductance having a first terminal, electrically coupled to the power supply terminal, and a second terminal;

a second resistor;

a second transistor having a drain terminal electrically coupled to the second terminal of the second inductance, a source terminal electrically coupled via the second resistor to ground, and gate electrically coupled to the first output port for receiving the first gate drive signal; and a second diode having an anode electrically coupled to the second terminal of the second inductance and a cathode electrically coupled to the output capacitor.

* * * * *